3,209,029
AMINOALKYL-AROMATIC-ETHYLAMINES
John G. Abramo, Wilmington, Del., and Earl C. Chapin, Springfield, Mass., assignors to Monsanto Company, a corporation of Delaware
No Drawing. Filed Feb. 11, 1963, Ser. No. 257,787
7 Claims. (Cl. 260—570.8)

The present application is a continuation in part of our copending application S.N. 3,974, filed Jan. 21, 1960 and now abandoned, which application was a continuation of our copending application S.N. 782,657, filed Dec. 24, 1958 and now abandoned and S.N. 813,635, filed May 18, 1959 and now abandoned.

The present invention is directed to diamines and more particularly to aminoalkyl-aromatic-ethylamines having the structures:

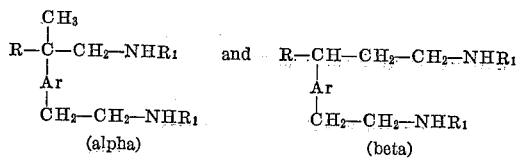

wherein Ar is an aromatic radical, R is selected from the class consisting of hydrogen and methyl radical and $R_1$ is a hydrocarbon radical.

Materials containing difunctional groups and particularly those whose functionality is manifest as primary and secondary amino groups can be subjected to condensation-type reactions with polybasic acids to provide polymeric materials, more specifically polyamides, which, when extruded and oriented by stretching and the like, produce useful fibers and films.

Accordingly, it is a principal object of the present invention to provide difunctional amines and more particularly aminoalkyl-aromatic-ethylamines.

Another object is to provide methods by which to produce these difunctional amines.

A further object is the provision of novel difunctional amines capable of use in condensation reactions to provide novel polyamides.

These and other objects of the present invention can be attained in aminoalkyl-aromatic-ethylamines having the structures:

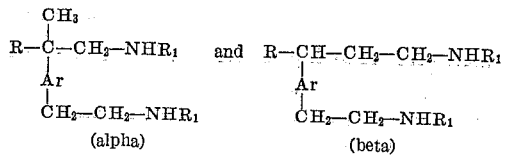

which can be produced directly by reduction of cyanoalkyl-aromatic-acetonitriles having the structures:

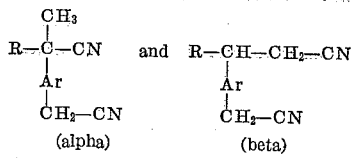

in the presence of an amine having the structure:

wherein throughout Ar is an aromatic radical, R is selected from the class consisting of hydrogen and methyl radical and $R_1$ is a hydrocarbon radical.

An alternative 2-stage method can be practiced to provide the secondary substituted diamines. Here the primary aminoalkyl-aromatic-ethylamines are first produced by reduction of the corresponding dicyanide. The primary diamines can then be alkylated or arylated to produce the secondary diamines in which hydrogens contained on the amino groups of the primary diamine have been substituted by hydrocarbon radicals.

The following examples are intended to illustrate the present invention. Where parts are used, parts by weight are intended unless otherwise described.

EXAMPLE I

A 2-liter autoclave provided with a stirrer is charged with 170 grams (ca. 1 mol) of p-(alpha-cyanoethyl)-benzyl cyanide, 5 grams of Raney nickel and 500 grams of ethylamine. The autoclave is flushed with hydrogen and the hydrogen pressure is raised to 2200 p.s.i. The autoclave is heated to 100° C. while maintaining hydrogen pressure at 1800–2200 p.s.i. After 6 hours, absorption of hydrogen ceases, whereupon the autoclave is cooled to room temperature and excess hydrogen and ethylamine are vented. The reaction mixture is diluted with 500 ml. of methanol and the catalyst is removed by filtration using diatomaceous earth as a filter aid. Methanol is removed by distillation at reduced pressure and the diamine product is distilled at reduced pressure. Infrared and elemental analysis establishes the product as N-ethyl-2-((4-(2-N-ethylaminoethyl)phenyl))-1-aminopropane.

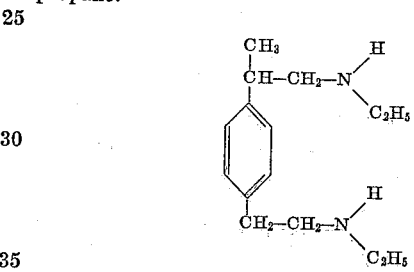

EXAMPLE II

The procedure of Example I is repeated using 220 grams (ca. 1 mol) of 1-(alpha-cyanoethyl)-4-cyanomethyl naphthalene in place of the p-(alpha-cyanoethyl)benzyl cyanide. The product is shown by infrared analysis and neutral equivalent to be N-ethyl-2-((4-(2-N-ethylaminoethyl)-1-naphthyl))-1-aminopropane.

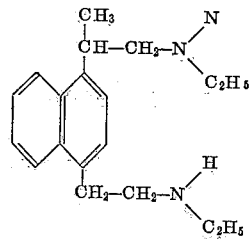

EXAMPLE III

The procedure of Example I is repeated using 250 grams (ca. 1 mol) of 4-(alpha-cyanoethyl)4'-cyanomethyl biphenyl in place of the p-(alpha-cyanoethyl)benzyl cyanide. The product is shown by infrared analysis and neutral equivalent to be N-ethyl-2-((4-(2-N-ethylaminoethyl)-4'-biphenyl))-1-aminopropane.

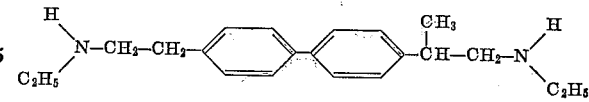

EXAMPLE IV

The procedure of Example I is repeated using 270 grams (ca. 1 mol) of 9-(alpha-cyanoethyl)-10-cyanomethyl anthracene in place of the p-(alpha-cyanoethyl) benzyl cyanide. The product is shown by infrared analysis and neutral equivalent to be N-ethyl-2-((9-(2-N-ethyl-aminoethyl)-10-anthryl))-1-aminopropane.

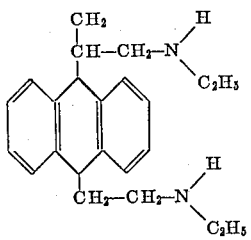

EXAMPLE V

The procedure of Example I is repeated using 185 grams (ca. 1 mol) of p-(alpha-cyanoisopropyl)benzyl cyanide in place of the p-(alpha-cyanoethyl)benzyl cyanide. The product is shown by infrared analysis and neutral equivalent to be N-ethyl-2-((4-(2-N-ethylaminoethyl)phenyl))-1-aminoisobutane.

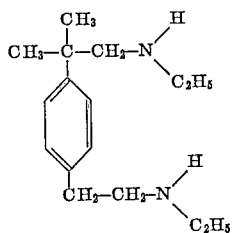

EXAMPLE VI

The procedure of Example I is repeated using 170 grams (ca. 1 mol) of a mixture of 25% of o-(beta-cyanoethyl)benzyl cyanide and 75% of p-(beta-cyanoethyl)benzyl cyanide in place of the p-(alpha-cyanoethyl)benzyl cyanide. The product is shown by infrared analysis and neutral equivalent to be a mixture of about 75% of N-ethyl-3-((4-(2-N-ethylaminoethyl)phenyl)) - 1 - aminopropane and 25% of the o-isomer.

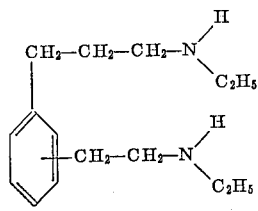

EXAMPLE VII

The procedure of Example I is repeated using 220 grams (ca. 1 mol) of 1-(beta-cyanoethyl)-4-naphthyl acetonitrile and 500 grams of phenylamine, respectively, in place of the p-(alpha-cyanoethyl)benzyl cyanide and ethylamine. The product is shown by infrared analysis and neutral equivalent to be N-phenyl-3-((4-(2-N-phenylaminoethyl)-1-naphthyl))-1-aminopropane.

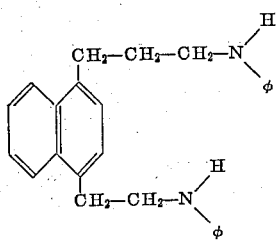

EXAMPLE VIII

The procedure of Example I is repeated using 170 grams (ca. 1 mol) of p-(beta-cyanoethyl)benzyl cyanide and 500 grams of phenylamine, respectively, in place of the p-(alpha-cyanoethyl)benzyl cyanide and ethylamine. The product is shown by infrared analysis and neutral equivalent to be N-phenyl-3-((4-(2-N-phenylaminoethyl)phenyl))-1-aminopropane.

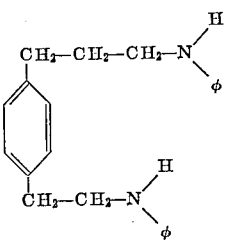

EXAMPLE IX

The procedure of Example I is repeated using 170 grams (ca. 1 mol) of p-(beta-cyanoethyl)benzyl cyanide and 500 grams of p-tolylamine, respectively, in place of the p-(alpha-cyanoethyl)benzyl cyanide and ethylamine. The product is shown by infrared analysis and neutral equivalent to be N-paratolyl-3-((4-(2-N-paratolyl-aminoethyl)phenyl))-1-aminopropane.

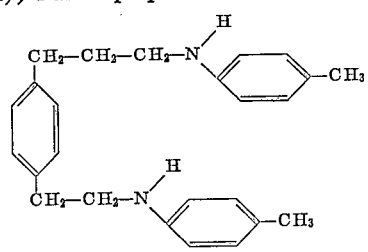

The following examples, X–XIII, illustrate the preparation of the compositions of this invention using the alternative 2-stage method.

EXAMPLE X

Part A

One hundred ml. of methanol at ice temperatures is saturated with ammonia gas. The resulting solution is added together with 34 grams (0.2 mol) of p-alpha-cyanoethyl)benzyl cyanide and 2 grams of Raney nickel to an ice cold 300 ml. pressure bomb. The bomb is closed and placed in a rocker assembly having a heating jacket. The bomb is flushed with hydrogen and then charged with hydrogen to a pressure of 2000 p.s.i. While being rocked, the bomb is heated to a temperature of 100° C. The pressure in the bomb is maintained at 1800–2000 p.s.i. throughout the reaction by introduction of more hydrogen as required. After about 2 hours at 100° C., hydrogen is no longer absorbed, the bomb is cooled, the excess hydrogen is vented, and the bomb opened. The catalyst is removed by filtration using diatomaceous earth as a filter aid. After removal of methanol by distillation at atmospheric pressure, the product is distilled at reduced pressure of 1 mm. Hg and a temperature of 135–145° C. The product is a clear colorless viscous liquid, soluble in water. Infrared and elemental analysis establishes the product as 2-((4-(2-aminoethyl)phenyl))-1-aminopropane.

Part B

A mixture of 17.8 grams (0.1 mol) of the 2-((4-(2-aminoethyl)phenyl))-1-aminopropane, 25 grams of bromobenzene and 10 grams of finely divided copper powder is charged into a 100 ml. flask fitted with a reflux condenser. The reaction mixture is heated to reflux temperature (about 160° C.) for 24 hours. The reaction mixture is cooled, diluted with 150 ml. of xylene and filtered to remove copper powder and other insoluble inorganic substances. The xylene solution is washed with water to remove unreacted 2-((4-(2-aminoethyl)phenyl)-1-aminopropane, followed by being dried with anhydrous magnesium sulfate and later filtered. The xylene solution is concentrated to yield a crystalline product which is then recrystallized from ethanol. Elemental analysis establishes the product as N-phenyl-2-((4-(2-N-phenyl-aminoethyl)phenyl))-1-aminopropane.

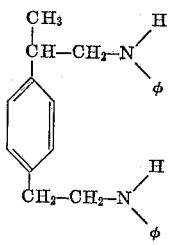

EXAMPLE XI

The procedure of Example X, Part A is repeated using 50 grams (ca. 0.2 mol) of 4-(alpha-cyanoethyl)-4'-canomethyl biphenyl in place of the p-(alpha-cyanoethyl) benzyl cyanide, and obtaining 2-((4-(2-aminoethyl)-4'-biphenyl))-1-aminopropane. 10 grams of this product are dissolved in 100 ml. of n-butanol and 5 grams of Raney nickel are then added to the solution. The reaction mixture is then refluxed for 24 hours. The catalyst is then removed by filtration and the excess butanol is removed by distillation at atmospheric pressure. The product is distilled at reduced pressure of 0.1 mm. Hg. The product is identified as N-butyl-2-((4-(2-N-butylaminoethyl)-4'-biphenyl))-1-aminopropane by infrared and elemental analysis.

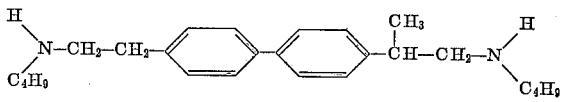

EXAMPLE XII

Part A

A 2-liter autoclave provided with a stirrer is charged with 255 grams (ca. 1.5 mols) of p-(beta-cyanoethyl) benzyl cyanide, 10 grams of Raney nickel and 500 grams of liquid ammonia at Dry Ice temperature. The autoclave is closed, flushed with hydrogen and the hydrogen pressure raised to 2500 p.s.i. The autoclave is heated to 105° C. while maintaining hydrogen pressure at 1800–2200 p.s.i. After 4 hours, absorption of hydrogen ceases, whereupon the autoclave is cooled to room temperature and excess hydrogen and ammonia are vented. The reaction mixture is diluted with 1000 ml. of methanol and the catayslt is removed by filtration using diatomaceous earth as a filter aid. Methanol is removed by distillation at atmospheric pressure and the diamine product distilled at reduced pressure of 0.1 mm. Hg. Infrared analysis and the neutral equivalent establishes the product as 3-((4-(2-aminoethyl)phenyl))-1-aminopropane.

Part B

Fifty grams of the product of Part A are dissolved in 500 ml. of ethanol, and 25 grams of Raney nickel are then added to this solution. The preceeding is refluxed for 24 hours. The catalyst is then removed by filtration and the excess ethanol is removed by distillation at atmospheric pressure. The material remaining after the ethanol is removed is distilled at reduced pressure of 0.1 mm. Hg. A small fore-run of unreacted 3-((4-(2-aminoethyl) phenyl))-1-aminopropane is obtained. The second fraction is identified as N-ethyl-3-((4-(2-N'-ethylaminoethyl)phenyl))-1-aminopropane by infrared analysis and its neutral equivalent. A smaller fraction of higher boiling material is obtained which is identified as N,N-diethyl-3-((4-(2-N',N'-diethylaminoethyl)-phenyl))-1-aminopropane.

EXAMPLE XIII

The procedure of Example XII is repeated using 375 grams (ca. 1.5 mol) of 4-(beta-cyanoethyl)-4'-cyanomethyl biphenyl in Part A in place of the p-(beta-cyanoethyl)benzyl cyanide and n-butanol in Part B in place of the ethanol. Infrared analysis and neutral equivalent establishes the product which results as N-butyl-3-((4-(2-N'-butylaminoethyl)-4'-biphenyl))-1-aminopropane.

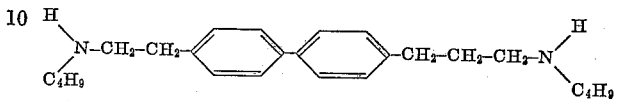

The aminoalkyl-aromatic-ethylamines of the present invention have the structures:

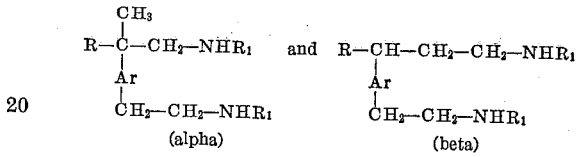

wherein Ar is an aromatic radical, R is selected from the class consisting of hydrogen and methyl radical and $R_1$ is a hydrocarbon radical of from about 1 to 20 carbon atoms. Thus, Ar may be, for example, a divalent phenylene, naphthylene, anthrylene, bi-phenylene structure and $R_1$ may be, for example, alkyl radicals such as methyl, ethyl, isopropyl, butyl, tertiary-butyl, amyl, hexyl, octyl, decyl, dodecyl, eicosyl, cycloalkyl radicals such as cyclopentyl, cyclohexyl; aryl radicals such as phenyl, tolyl, xylyl, naphthyl and anthryl. Both $R_1$ groups may be the same or they may be different.

Illustrative of the compounds obtained are

N-methyl-2((4-(N-methyl-2-aminoethyl)phenyl))-1-aminopropane,
N-methyl-3-((4-(N-methyl-2-aminoethyl)phenyl))-1-aminopropane,
N-methyl-3-((4-(N-ethyl-2-aminoethyl)phenyl))-1-aminobutane,
N-ethyl-2-((4-N-methyl-2-aminoethyl)phenyl))-1-aminoisobutane,
N-ethyl-3-((4-(N-methyl-2-aminoethyl)phenyl))-1-aminobutane,
N-phenyl-2-((4-(N-phenyl-2-aminoethyl)phenyl))-1-aminopropane,
N-tolyl-2-((4-(N-phenyl-2-aminoethyl)phenyl))-1-aminopropane,
N-tolyl-2-((4(N-phenyl-2-aminoethyl)phenyl))-1-aminoisobutane,
N-phenyl-2-((4-(N-tolyl-2-aminoethyl)pheny))-1-aminoisobutane,
N-phenyl-3-((4-(N-tolyl-2-aminoethyl)phenyl))-1-aminobutane,
N-methyl-2-((4-(N-phenyl-2-aminoethyl)phenyl))-1-aminopropane,
N-methyl-3-((4-(N-phenyl-2-aminoethyl)phenyl))-1-aminopropane,
N-phenyl-2-((4-N-methyl-2-aminoethyl)phenyl))-1-aminoisobutane,
N-octyl-2-((4-(N-ethyl-2-aminoethyl)phenyl))-1-aminopropane,
N-eicosyl-2-((4-(N-phenyl-2-aminoethyl)phenyl))-1-aminopropane,
N-cyclohexyl-2-((4-N-cyclohexyl-2-aminoethyl)-phenyl))-1-aminopropane, and also
N-methyl-2-((9-(N-methyl-2-aminoethyl)-10-anthryl))-1-aminopropane,
N-methyl-3-((9-(N-methyl-2-aminoethyl)-10-anthryl))-1-aminopropane,
N-phenyl-2-((4-(N-phenyl-2-aminoethyl)-4'-bi-phenyl))-1-aminoisobutane,
N-phenyl-2-((4-(N-phenyl-2-aminoethyl)-4-naphthyl))-1-aminopropane, etc.

and isomers of the preceding which result from varying the positions of the primary or aminoalkyl substituents on the aromatic radical symbolized by Ar. By primary substituents, are meant the aminoalkyl substituents:

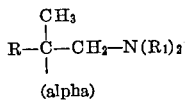
(alpha)

and

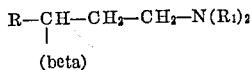
(beta)

and the ethylamino substituent:

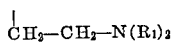

Nuclear substituents, in addition to the amino-type primary substituents already indicated, can be accommodated on the aromatic radical defined at Ar. These can include halogens and various alkyl radicals such as methyl, ethyl and the like.

The aminoalkyl-aromatic-ethylamines of the present invention can be obtained through a reduction process using as a starting material a corresponding cyanoalkyl-aromatic-acetonitrile having the structures:

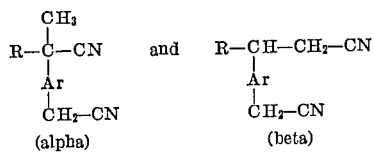

wherein Ar is an aromatic radical and R is selected from the class consisting of hydrogen and methyl radical. The presently prescribed reduction can be effected by hydrogenation of the corresponding cyanoalkyl-aromatic-acetonitriles in the presence of a primary amine having the structure:

$$H_2N-R_1$$

wherein $R_1$ is a hydrocarbon radical of from about 1 to 20 carbon atoms. Therefore, the ethylamine, phenylamine (aniline) and tolylamine employed in the examples may be replaced, with equivalent results, by such other primary amines as, for example, methylamine, isopropylamine, n-butylamine, n-amylamine, hexylamine, isooctylamine, decylamine, eicosylamine, xylylamine mixtures, benzylamine, alpha-naphthylamine, beta-naphthylamine, alpha-anthramine, beta-anthramine, cyclohexylamine and mixed isomers of ethylaniline. The reduction reaction is expedited by use of a hydrogenation catalyst together with maintenance of the hydrogen at elevated pressure. The hydrogenation catalyst which can be used can be Raney nickel, supported nickel and the like. Hydrogen pressure which can be used to expedite the process are those ranging between 50 to 300 atmosphere with a further preference directed to pressures of about 2000 lbs./in.² The reaction can be carried out at a temperature of 70° to 150° C. with the further preference directed to about 100° C. The time of reaction will generally range from 1 to 6 hours with about 3 hours being the usual time required.

Other reductions can be practiced on the corresponding cyanoalkyl-aromatic-acetonitriles to produce the desired diamines. Illustrative of these, the corresponding cyanoalkyl-aromatic-acetonitriles can be reduced with (a) lithium aluminum hydride in the presence of an inert solvent or with (b) sodium in the presence of an alcohol, to produce the primary aminoalkyl-aromatic-ethylamines. The primary diamines can then be converted to the substituted secondary amines by alkylation or arylation carried out on the hydrogens contained on the amino groups of the primary diamines.

Alkylation or arylation of the primary amines can be accomplished using an alcohol having an alkyl or aryl radical of the type desired for substitution on the amino group or groups, in conjunction with a catalyst such as Raney nickel. The primary amines can also be alkylated or arylated to the desired secondary diamines by using the corresponding alkyl halide or aryl halide. In this regard the previously described direct method can be considered as effecting alkylation or arylation during hydrogenation by conducting the hydrogenation in the presence of a primary amine.

The aminoalkyl-aromatic-ethylamines of this invention are eminently suited for co-reaction with other polyfunctional compounds to provide linear polymers, more specifically polyamides. Suitable polyfunctional compounds include adipic acid, maleic acid, etc. For example, subjecting an equimolar mixture of, e.g., adipic acid and e.g., the N-ethyl-2-((N-ethyl-2-aminoethyl)phenyl))-1-aminopropane prepared in Example I to elevated temperatures, i.e., 225–350° C., in the presence of a catalyst such as p-toluenesulfonic acid results in the formation of polymeric solids, i.e., polyamides, which may be extruded, molded or cast into a wide variety of useful forms, e.g., gears, mechanical parts and fibers for textile purposes.

It will thus be seen that the objects set forth above among those made apparent from the preceding description are efficiently attained, and since certain changes may be made in carrying out the above process and the diamine products which result without departing from the scope of the invention, it is intended that all material contained in the above description shall be interpreted as illustrative and not in a limiting sense.

What is claimed is:
1. An aminoalkyl-aromatic-ethylamine of a formula selected from the group consisting of:

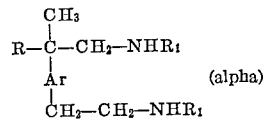
(alpha)

and

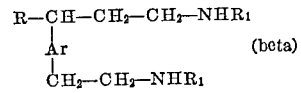
(beta)

wherein, in each of the above formulae, Ar is selected from the class consisting of phenylene, naphthylene, anthrylene and biphenylene, R is a group selected from the class consisting of hydrogen and methyl and each $R_1$ is independently selected from the class consisting of lower alkyl, phenyl and tolyl.

2. N-ethyl-3-((4-(2 - N - ethylaminoethyl)phenyl))-1-aminopropane.
3. N-ethyl-2-((4 - (2 - N-ethylaminoethyl)phenyl))-1-aminopropane.
4. N-phenyl-3-((4 - (2-N-phenylaminoethyl)phenyl))-1-aminopropane.
5. N-phenyl-2-((4-(2 - N-phenylaminoethyl)phenyl))-1-aminopropane.
6. N-butyl-3-((4 - (2 - N-butylaminoethyl) - 4'-biphenyl))-1-aminopropane.
7. N-butyl-2-((4-(2 - N-butylaminoethyl) - 4'-biphenyl))-1-aminopropane.

References Cited by the Examiner
UNITED STATES PATENTS

| | | | |
|---|---|---|---|
| 2,387,873 | 10/45 | Boon et al. | 260—570.8 X |
| 2,464,692 | 3/49 | Kirk et al. | 260—570.8 |
| 2,464,693 | 3/49 | Kirk et al. | 260—570.8 |
| 2,479,673 | 2/50 | Kirk | 260—570.8 X |
| 2,891,088 | 6/59 | Condo et al. | 260—570.8 X |
| 2,900,369 | 8/59 | Edwards et al. | 260—570.8 X |

CHARLES B. PARKER, *Primary Examiner.*

IRVING MARCUS, *Examiner.*